(12) United States Patent
Van Ruymbeke

(10) Patent No.: US 6,380,930 B1
(45) Date of Patent: Apr. 30, 2002

(54) LAPTOP TOUCHPAD WITH INTEGRATED ANTENNA

(75) Inventor: Gilles Van Ruymbeke, Menlo Park, CA (US)

(73) Assignee: K-Tech Devices Corporation (JP)

( * ) Notice: Subject to any disclaimer, the term of this patent is extended or adjusted under 35 U.S.C. 154(b) by 0 days.

(21) Appl. No.: 09/264,802

(22) Filed: Mar. 9, 1999

(51) Int. Cl.[7] ................................................. G09G 5/00
(52) U.S. Cl. ...................... 345/173; 345/174; 345/175; 345/179; 178/18.01; 178/18.02; 178/18.03; 178/18.04; 178/18.05
(58) Field of Search ............................... 345/173, 174, 345/175, 179; 178/18.01, 18.02, 18.03, 18.04, 18.05

(56) References Cited

U.S. PATENT DOCUMENTS

| | | | |
|---|---|---|---|
| 5,184,314 A | | 2/1993 | Kelly et al. ............ 364/709.01 |
| 5,663,748 A | * | 9/1997 | Huffman et al. ............ 345/173 |
| 5,729,219 A | * | 3/1998 | Armstrong et al. ............ 341/20 |
| 5,847,698 A | * | 12/1998 | Reavey et al. ............ 345/173 |
| 5,900,867 A | * | 5/1999 | Schindler et al. ............ 345/327 |
| 5,942,733 A | * | 8/1999 | Allen et al. ............ 178/18.01 |
| 6,020,878 A | * | 2/2000 | Robinson ............ 345/173 |

FOREIGN PATENT DOCUMENTS

| | | | |
|---|---|---|---|
| CN | 347126 | 11/1986 | |
| EP | 05189191 | 7/1993 | ............ G06F/3/147 |
| WO | WO 97/44707 | 11/1997 | ............ G02F/1/33 |

* cited by examiner

Primary Examiner—Richard Hjerpe
Assistant Examiner—Jean Lesperance
(74) Attorney, Agent, or Firm—Brian N. Young; Townsend and Townsend Crew LLP

(57) ABSTRACT

An antenna for wireless communication into a touchpad module. A touchpad module, which can be inserted into an aperture in a laptop computer, includes a touch sensor for detecting touch in a touch sensor circuit for processing signals from the touch sensor. The antenna is connected to a port (input or output) on the touchpad module. The touchpad provides an open aperture for the antenna to communicate with the outside world, without being blocked by the shielding used in a laptop computer.

21 Claims, 3 Drawing Sheets

LAPTOP TOUCHPAD WITH INTEGRATED ANTENNA

BACKGROUND OF THE INVENTION

The present invention relates to laptop computers, and in particular to wireless communication between a pointing device and a laptop computer.

A wide variety of pointing devices have been developed for personal computers. A user can hook up a mouse, trackball, joystick, or game pad, for instance. Touch pads and micro sticks are also used, although typically these are integrated into a keyboard of a laptop computer. Cordless pointing devices have been developed, to avoid the need to move a cable around with the pointing device. For example, a mouse can have a radio transmitter which transmits to a receiver plugged into an RS232 port of a computer. For desktop personal computers, a user can switch which device is plugged in depending upon the application. For a laptop, however, usually the user picks a laptop which already has integrated a particular type of pointing device with which the user is comfortable. This could either be a touchpad, microstick or trackball, for instance.

Wireless technology has also been applied in a variety of applications relating to personal computers other than between a pointing device and a receiver plugged into a personal computer. For example, a universal wireless interface between PC's and a number of electronic devices has been proposed by Intel and others, code-name Bluetooth. In particular, a radio receiver in a personal computer would communicate with a cell phone to allow wireless e-mail, etc. The Bluetooth module includes electronics and an antenna. For a laptop computer, the computer housing is typically a shield for the electronics inside, making an integrated antenna problematic. When mounted in a notebook or laptop PC, the Bluetooth module is intended to be located on the top edge of the display, outside the shields in the computer housing.

An alternate technology to RF radio for a wireless connection is an IrDA link. This is employed in many notebooks and in the newest Pakn Pilot™.

SUMMARY OF THE INVENTION

The present invention integrates an antenna for wireless communication into a touchpad module. A touchpad module, which can be inserted into an aperture in a laptop computer, includes a touch sensor for detecting a user's touch, and a touch sensor circuit for processing signals from the touch sensor. The antenna is connected to the touchpad module.

The novel use of the touchpad for including an antenna provides an open aperture for the antenna to communicate with the outside world, without being blocked by the shielding used in a laptop computer. An advantage of using the touchpad aperture for the antenna is that it is a relatively large size opening already available in a laptop computer, which is not shielded. It also allows the antenna to be integrated into the computer without changing the form factor of the laptop computer.

In one embodiment, the touchpad module can contain a switching circuit allowing it to switch between an input from the touch sensor and the antenna. Thus, a user who is more comfortable with an external pointing device, such as a mouse, trackball, etc. can provide the input to the computer while disabling the touchpad at the same time. Alternately, both pointing devices can be active at the same time. In one embodiment some of the circuitry can be shared between the external pointing device and the touchpad module.

The antenna can be implemented in a variety of embodiments. In one embodiment, the touchpad sensor is mounted on a flex circuit, with the electronics off to the side away from the aperture, with a guard ring around the aperture being used for the antenna. In another embodiment, all of the traces on the touchpad are used for the antenna, with the computer case being ground. Alternately, an antenna dipole could be formed using different traces of a sensor array. Alternately, the whole array of traces could be used as an antenna. In yet another embodiment, the ground plane under the array of traces could be used as an antenna.

The antenna of the invention is connected to a receiver, and can also be connected to a transmitter. Such a transmitter may be used for providing force feedback. In addition, multiple devices could then wirelessly connect to the computer. For example, a mouse input could provide additional features for a joystick, or could activate a force feedback function on itself or a joystick or other device.

For further understanding of the nature and advantages of the invention, reference should be made to the following description taken in conjunction with the accompanying drawings.

DESCRIPTION OF THE SPECIFIC EMBODIMENTS

Figure 1:
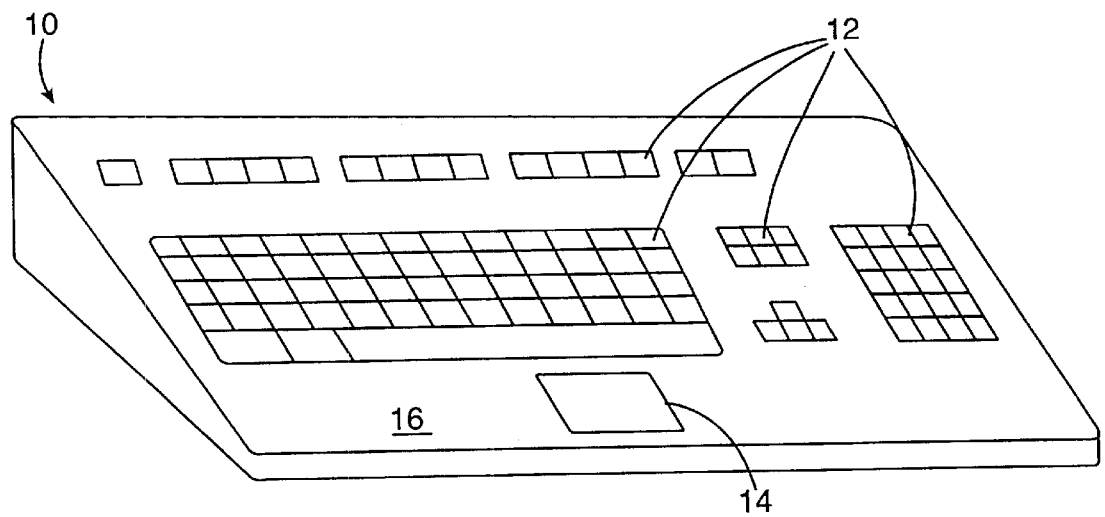
FIG. 1 is a diagram of a laptop computer keyboard including a touchpad module according to the invention.

FIG. 1 shows a keyboard 10 having a number of keys 12. At the bottom center of the keyboard is a touchpad module 14 according to the invention which includes an antenna. Module 14 is an aperture in the housing 16 which is opened to the outside, and is not shielded by housing shielding. In particular, laptop computers may include a metal housing to shield the internal components from external interference (or vice-versa), defeating the ability to place an antenna inside of the housing. The provision of an antenna in the touchpad module uses an existing aperture and an existing form factor of the laptop to provide a wireless connection.

The antenna can be implemented in any manner. A number of illustrative embodiments are set forth below, but not in any particular order of preference.

Figure 2:
FIG. 2 is a side view illustrating the layers of a touchpad module.

FIG. 2 is a side view illustrating a simplified cross section of one embodiment of the touchpad module. A printed circuit board (PCB) 20 has a number of layers 22 on its top side forming the touch sensor array in a known manner. In particular, for a capacitive touchpad, these include traces in the X direction and Y direction, separated by dielectric layers and covered with a protective layer (alternately, for a resistive touchpad, a resistive layer can be used, or a combined resistive/capacitive touchpad can be used). The array is connected to circuitry mounted on the bottom side 24 of the PCB. Alternately, instead of an array a resistive layer for a resistive touchpad could be used, or any other touchpad technology.

Figure 3:
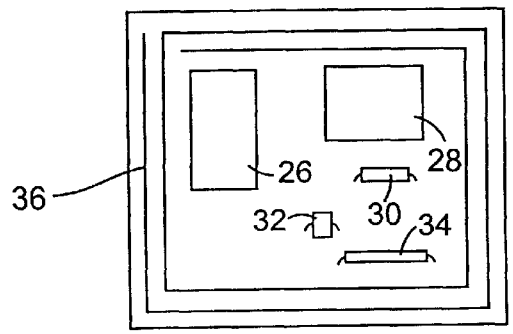
FIG. 3 is a diagram of a circuit board for touchpad including an antenna.

FIG. 3 illustrates bottom side 24 of PCB 20 of FIG. 2. The PCB includes a number of chips 26 and 28 containing electronics for the touch sensor array, as well as a variety of discreet components, such as components 30, 32 and 34. The present invention also adds an antenna 36, which is shown extending around the perimeter of the PCB.

In one embodiment, the antenna may be formed from a guard ring present on a circuit board and used for ESD protection. By making an electrical connection to an I/O port as illustrated below in FIG. 4, this guard ring can perform an antenna function. The antenna usage would be at a specific frequency. A system consisting of an electronic circuit connected to the guard ring will provide the resonant circuit used for radio reception and transmission. Alternately, a technique allowing a spread spectrum antenna could be used.

Figure 4:
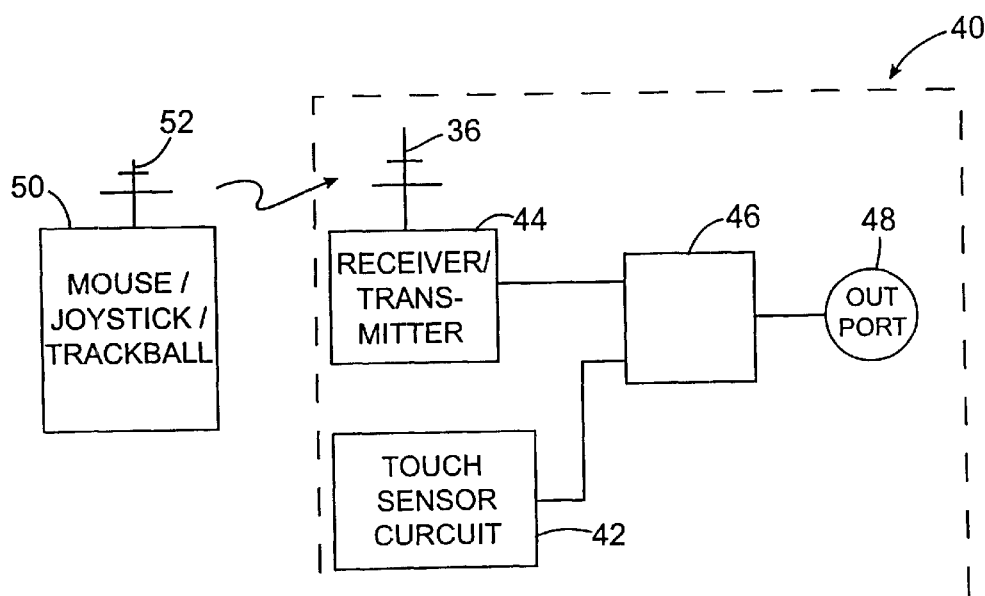
FIG. 4 is a block diagram of the electronics of the invention.

FIG. 4 illustrates an electronic block diagram of one embodiment of the invention. A touchpad module 40 is shown having a touch sensor circuit 42 as in the prior art. Also including is the antenna 36 and a receiver/transmitter circuit 44. Receiver/transmitter 44 and touch sensor circuit 42 are connected to a circuit 46, which may be a switch which provides a signal from one or the other or both, to an output port 48. Alternately, circuit 46 could combine both signals, or could function as an input port, such as for a force feedback signal. In addition, circuit 46 may include an encoding function for encoding either output or input signals.

An external pointing device 50 has its own antenna 52 for wireless communication with antenna 36 of touchpad module 40. Pointing device 50 could be a mouse, joystick, trackball, wheel, keyboard, or any other pointing device.

In one embodiment, circuit 46 is a switch which can automatically determine whether an input is coming from receiver 44 or touch sensor 42, and pass through the signals from only the active device, disabling the other device. This would allow avoiding, for instance, an accidental touching of a touchpad while the user was intending to operate the cursor from a external wireless mouse.

In an alternate embodiment, a separate output port may be used. In particular, for joysticks a higher data rate bandwidth is typically required than for touchpads, which might be benefited by a separate output port from the touchpad module. In one embodiment, a USB (Universal Serial Bus) connection is used between the touchpad module and the host from output port 48.

The level of sharing of circuitry by the touchpad and the antenna and its associated circuitry can be varied according to the application. In one embodiment, only the power supply might be shared. Alternately, through the use of the circuit 46 and the single port 48 as shown in FIG. 4, additional circuitry can be shared.

The size and shape of the antenna can also be varied. In particular, a smaller or larger antenna may be used depending whether a higher or lower frequency is used.

In yet another embodiment, the antenna and receiver can be bidirectional. That is, the touchpad module may have a transmitter for transmitting signals over the antenna to the external pointing device. This embodiment is applicable, for example, to force-feedback joysticks where a force-feedback signal is transmitted to the joystick from the computer.

The antenna and receiver of the invention could connect to multiple pointing devices. The signals from the pointing devices could be received alternately, or at the same time. In one embodiment, a high quality joystick could be emulated using a simpler joystick and a mouse. The mouse could be used to provide additional input buttons for joystick functions not provided on the simple joystick. In addition, there can be interaction between the pointing devices. For example, movement of the mouse could trigger force feedback on the joystick. Circuit 46 of FIG. 4 could include some high level functions for providing interaction between multiple pointing devices.

Figure 5:
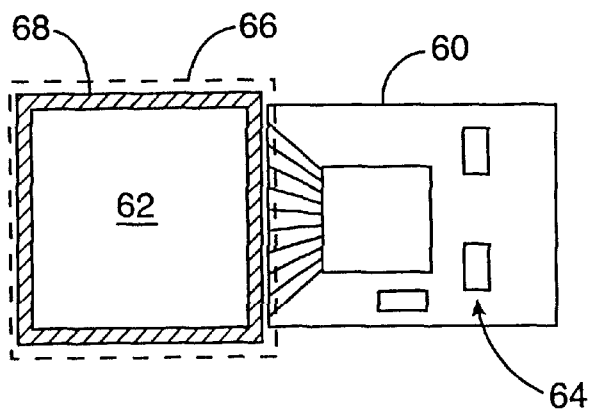
FIG. 5 is a block diagram of an embodiment using a flex sensor and guard ring.

A possible disadvantage of the circuit of FIG. 3 is that the ground plane or other electronic traces inside the antenna could dampen the antenna signal, even if these elements are not connected to ground. One embodiment that reduces such interference is shown in FIG. 5. FIG. 5 shows a touchpad sensor mounted on a flexible sheet 60, which may be polyester, for instance. The sensor 62 is mounted on one side, while components 64, including a processor, are mounted off to another side. Sensor 62 can be an array of traces for a capacitive sensor, a resistive plane for a resistive sensor, or any combination or different touchpad technology. Array 62 is within an aperture indicated by dotted lines 66, while components 64 are outside of this aperture. In the embodiment shown, a guard ring 68 is then used for the antenna. The advantage of the flex sensor of FIG. 5 is that since the sensors of 64 are mounted off to the side of sensor 62, a ground plane is not needed to separate the two. This eliminates the potential interference of the ground plane with the antenna function.

Figure 6:
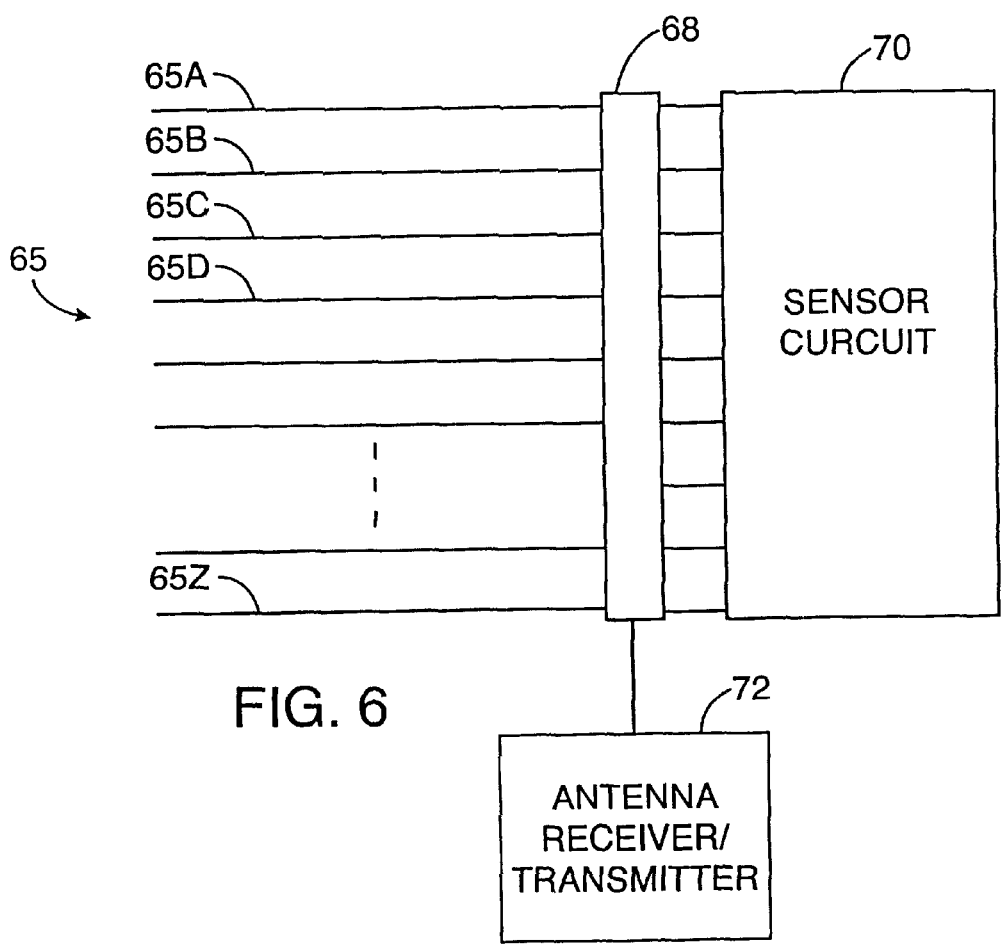
FIG. 6 is a diagram of an embodiment using multiple lines from a sensor array as an antenna dipole.

FIG. 6 shows an alternate embodiment in which a number of lines 65 form a touch sensor array of individual lines 65A–65Z. These are connected through a switching circuit 68 to a sensor circuit 70. Sensor circuit 70 can be a circuit for multiplexing individual lines and reading them in a scan order. An example of circuitry for performing this function is set forth in another patent application of the same assignee, application Ser. No. 08/582,769, filed Jan. 4, 1996, "Touch Sensing Method And Apparatus"., incorporated herein by reference. Circuitry for receiving a signal from an antenna is set forth in additional copending applications, application Ser. No. 08/932,753, filed Sep. 17, 1997, "Antenna System And Apparatus For Radio-Frequency Wireless Keyboard", and application Ser. No. 09/163,737, filed Sep. 30, 1998, "Radio Frequency Amplifier System And Method", both of which are incorporated herein by reference.

Returning to FIG. 6, switching circuit 68 allows the signals from any particular line of line 65 to be diverted to an antenna receiver/transmitter circuit 72. In one embodiment, two adjacent lines 65B and 65C can be connected to the antenna receiver/transmitter, forming two poles of a dipole antenna. One of the dipoles could be grounded, or alternately they can have different phases applied on each line to provide the antenna function. A variety of embodiments are possible. Instead of 65B and 65C being adjacent to each other, they could be widely separated. The particular wires used for the antenna could be varied. Alternately, all the wires could be used for the antenna, or circuit 68 could sequentially shift through the wires using different wires for the antenna at different points in time. Alternately, two groups of wires could be used for the antenna. Or, one or more of the wires in the X direction could be used for one pole, while one or more of the wires in the Y direction could be used for the other.

The antenna function can occur at the same time as other lines are being sequentially sampled for touch sensing, with the antenna lines being shifted so that the same lines as being used for touch sensing are not simultaneously being used for antenna sensing. Alternately, to avoid any possible interference problems, the touch sensing and antenna functions can be time multiplexed.

In a typical touch sensor array, part of the time is spent actually scanning the wires and processing the signals, with another part of the time being used for transmission of the data to the host. Thus, after the scanning function is done, this leaves part of every time period (during transmission to the host and/or processing) to be used for antenna functions.

The ability to use different wires of the sensor array allows a directional capability to be applied. Using all of the wires as separate antennas read sequentially essentially provides a phased array antenna, in which the direction of the transmitting signal can be determined. The direction could also be roughly determined simply by using one of the other sides of the sensor array, such as using half the wires on one side and then alternately half on the other side. This would allow determination, for example, of whether the user has the mouse on the right or left side of the laptop, indicating whether the user is right or left-handed. This would allow the laptop to automatically configure for a left or right-handed user in configuring the mouse buttons, for example. Alternately, this allows a multi-user game to determine automatically which user is providing the input, the player on the left, or the player on the right. The identity of a user amoung multiple users can be determined in this manner.

In a touch sensor array having X and Y direction wires, with the lower layer being grounded, it would be preferable to use the upper layer so it is not shielded by the other layer.

Alternate arrangements for an antenna could be used, so long as two separate nodes are provided (for the signal and ground, or two phases). Thus, any two wires or combination of wires or traces could be used. In another embodiment, all of the wires or traces in the sensor could be used as the antenna, with the case of the computer being used for ground. Thus, the receiver would detect the concurrent movement of all of the wires together. Since there is parasitic capacitive coupling at high frequencies between the different wires, they could be detected as moving together. In another embodiment, the ground plane can be used as the antenna. Where the case is used as the ground connection, it can be connected to the touchpad array when it is clipped into the aperture or through a guard ring which forms a connection when mounted in place. Alternatively, conductive tape or any other connection method could be used. Alternately, the touchpad's connection to power ground could be used.

In an alternate embodiment, a touchpad module with an antenna according to the present invention could be incorporated into a remote control device. The touchpad can be used for inputs, while the antenna is used to transmit the input signal to the remote device being controlled. This would allow, for example, a metal case for the remote control, making it more robust than plastic cases. The antenna in the exposed touchpad in the remote will not be blocked by such a metal case.

As will be understood by those skilled in the art, the present invention may be embodied in other specific forms without departing from the essential characteristics thereof For example, rather than the antenna being on the printed circuit board, it could be in a separate, flexible layer mounted between or adjacent the layers used for the touchpad array itself In addition, rather than being around the border of the printed circuit board, the antenna could be near the center or could extend lengthwise through the center, or have any other geometry. For example, the antenna could be a straight length of metal, rather than a loop. Accordingly, reference should be made to the following claims which set forth the scope of the invention.

What is claimed is:

1. A computer having shielding with an aperture in said shielding, said computer including a touchpad module mounted in said aperture, said touchpad module comprising:
   a touch sensor for detecting touch;
   a touch sensor circuit, coupled to said touch sensor, for processing signals from said touch sensor;
   an antenna mounted on said touchpad module; a and
   an output port coupled to said antenna and said touch sensor circuit, for providing signals from said antenna and said touch sensor to said computer.

2. The module of claim 1 further comprising:
   a flex circuit having said touch sensor on a first portion and said touch sensor circuit on a second portion, said touch sensor being configured to be placed within an aperture of laptop computer.

3. The touchpad module of claim 1 further comprising:
   an array of conductive lines in said touch sensor;
   an antenna receiver circuit; and
   a switching circuit configured to couple at least one of said sensor lines to said antenna receiver circuit.

4. The touchpad module of claim 3 wherein said switching circuit is configured to alternate between a plurality of said sensor lines.

5. The touchpad module of claim 4 further comprising:
   a directional circuit configured to determine a direction of a transmitted signal from relative signals received on different ones of said sensor lines.

6. The touchpad module of claim 1 wherein said antenna comprises a ground plane of said touchpad module.

7. The touchpad module of claim 1 wherein said antenna comprises an array of traces of said touch sensor.

8. The touchpad module of claim 7 wherein said antenna further comprises all the traces of said touchpad module, with a connection provided for connecting to a computer case as a ground plane.

9. The module of claim 1 further comprising:
   a printed circuit board;
   said touch sensor circuit being mounted on a first side of said printed circuit board; and
   said antenna being mounted on the opposite side of said printed circuit board from said touch sensor circuit.

10. The module of claim 1 wherein said antenna is proximate a border of said module.

11. The module of claim 1 further comprising:
    a port coupled to said antenna.

12. The module of claim 11 further comprising:
    a circuit, having inputs coupled to said touch sensor circuit and said antenna, and an output coupled to said output port.

13. The module of claim 12 wherein said circuit is a switching circuit.

14. The module of claim 13 further comprising:
    a receiver circuit coupled between said antenna and said switching circuit.

15. The module of claim 1 wherein said antenna comprises at least one loop around said module.

16. The module of claim 1 wherein said module includes a plurality of layers, one of said layers including said antenna.

17. The module of claim 1 wherein said port comprises an I/O port.

18. The module of claim 1 wherein said touch sensor comprises a capacitive array.

19. The module of claim 1 wherein said touch sensor comprises a resistive sensor.

20. The module of claim 1 wherein said touch sensor is configured to be placed within an aperture of a remote control unit, with said antenna being configured to act as a transmitting antenna.

21. A computer having shielding with an aperture in said shielding, said computer including a touchpad module mounted in said aperture, said touchpad module comprising:

a touch array for detecting touch;

a touch sensor circuit, coupled to said touch array, for processing signals from said touch array;

an antenna mounted on said touchpad module;

an output port coupled to said antenna and said touch sensor circuit for providing signals from said antenna and said touch sensor to said computer;

a switching circuit, having inputs coupled to said touch sensor circuit and said antenna, and an output coupled to said output port; and a receiver circuit coupled between said antenna and said switching circuit.

\* \* \* \* \*